May 30, 1933.  W. T. TOOLAN  1,911,778
DOUBLE ENDED SLIP FISHHOOK
Filed Dec. 17, 1931
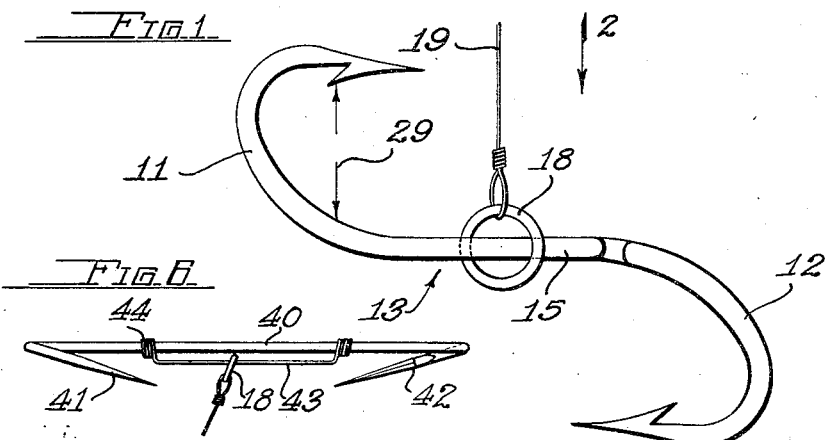
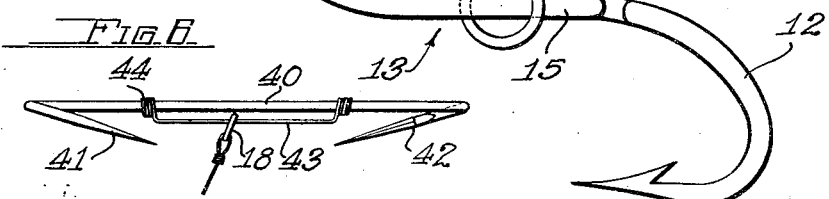
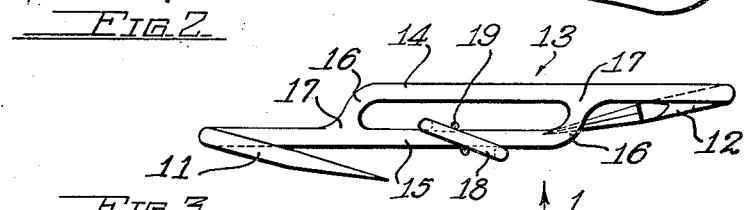
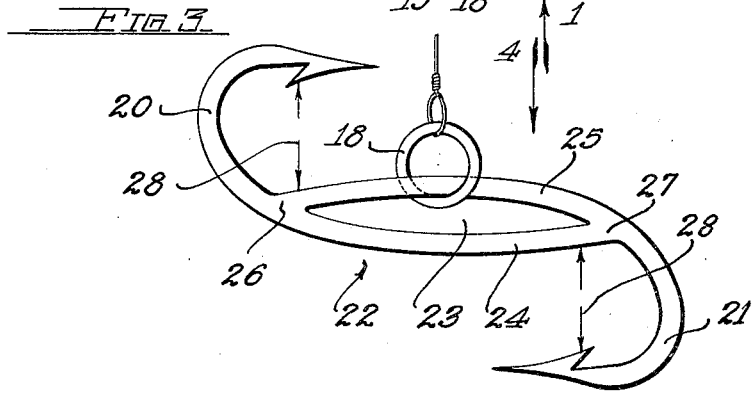
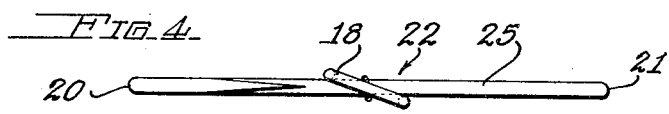
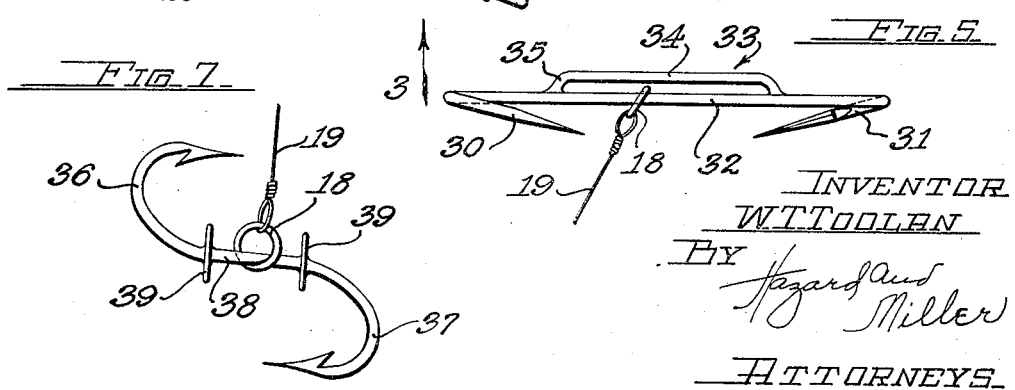
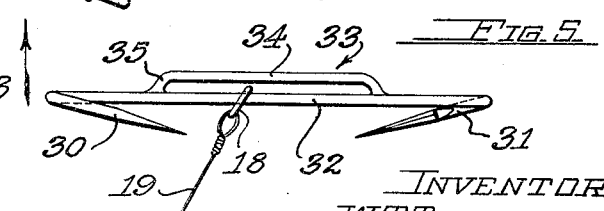
INVENTOR
W. T. TOOLAN
BY Hazard and Miller
ATTORNEYS Patented May 30, 1933

1,911,778

UNITED STATES PATENT OFFICE

WILLIAM THOMAS TOOLAN, OF LOS ANGELES, CALIFORNIA

DOUBLE ENDED SLIP FISHHOOK

Application filed December 17, 1931. Serial No. 581,669.

My invention relates to a fish hook which is double ended, that is, it has prongs at its opposite ends for baiting and to hook the fish.

Another feature of my invention in this type of hook is providing a slip connection between the hook and the line so that the hook may slip relative to the line and, therefore, if a fish breaks loose from one hook, there are good chances of the hook at the opposite end catching the fish, as such hook will swing on the slip connection when the fish fights to loosen itself from the hook on which it is caught.

Another object of my invention is to form a double ended hook with what might be termed a stem connecting the hooks at opposite ends, and on this stem is mounted a ring, and the ring is connected to the line. The ring has a limit slip motion on the stem so that the ring may be closer to the hook at one end in the fishing position, the fish usually being caught by the hook most remote from the ring should the fish fight loose from the first hook. The fighting and releasing action of the fish may slip the ring longitudinally of the stem and bring the other hook into position to catch the fish.

Another advantage of the double ended hook with a slip connection is that when a fish is caught by one hook the pull on the line may bring the other hook into a position to catch the fish, that is, presuming one hook may be caught in either the upper or lower jaw of the fish, then the pull on the line swings the other hook so that it may catch the other jaw.

Another advantage of my double ended hook is in securing the bait to the hook. This may be done with small minnows by, for instance, hooking one minnow through the nose or mouth with one hook and another minnow by the tail to the other hook; or with another arrangement, both of the hooks may be caught in opposite positions, as on opposite sides, of the bait. Another manner of securing the bait to the hook is by catching one hook in the jaws of the bait, extending the stem through the gills, and engaging the other hook back of the gills. In fishing for larger fish with larger bait, the hook may be placed on the side of the bait and secured in such position by a rubber band encircling the stem of the hook and the body of the fish used as bait.

In constructing my invention, in the preferred form the stem is made with a loop closed at opposite ends adjacent the hooks, with the ring having a sliding fit on one of the sides of the loop, the loop being made elongated so that the ring and, hence, the line may slip lengthwise of the stem from one end to the other.

In one form of my invention I have the loop substantially transverse to the plane of the hooks, and in another construction the loop may be in the same plane as that of the hooks. Manifestly, also, the hooks may be offset or tilted in regard to the position of the loop.

In another form of my invention I may connect the two end hooks with a single stem with abutment shoulders on this stem, with the ring sliding between these shoulders.

My invention is illustrated in connection with the accompanying drawing, in which:

Fig. 1 is a side elevation taken in the direction of the arrow 1 of Fig. 2 of one form of my hook, this construction having the loop in the stem substantially at right angles to the plane of the hooks;

Fig. 2 is a plan taken in the direction of the arrow 2 of Fig. 1;

Fig. 3 is a side elevation of a modification taken in the direction of the arrow 3 of Fig. 4, in which construction the loop of the stem is substantially in the plane of the hooks;

Fig. 4 is a plan taken in the direction of the arrow 4 of Fig. 3;

Fig. 5 is a plan of an alternative form, in which one side of the loop forms a straight portion of the stem;

Fig. 6 is a plan of a form alternative to that of of Fig. 5, with a fine wire parallel to the stem of the hook;

Fig. 7 is a side elevation of a further modified construction using a single stem to connect the hooks, with abutment shoulders thereon.

Dealing first with the construction of Fig.

1, this may be described as having a first hook 11 and a second hook 12 connected by a stem 13. This stem has a loop, of which one portion 14 of the stem forms one side and another part 15 of the stem the other side. These portions of the loop are connected to each other by bent ends 16, and at the point 17 may be secured by welding, soldering, or by any suitable joint; or, if desired, the whole hook may be stamped out of a flat sheet or strip of metal. A ring 18 is illustrated as slidable on one of the sides of the loop and has the line 19 connected thereto. In this construction it will be seen that the two sides 14 and 15 of the loop are practically in a common plane, and this may be regarded as substantially at right angles to the plane of the hooks except that in this illustration the point and prong of the hooks is bent over to one side. The purpose of bending the prong end of the hooks is so that when the ring slides to the bent end sections 16 that the pull on the line will be somewhat in alignment with the line of the offset point and prong of the hook.

In the construction of Figs. 3 and 4, the first hook may be designated by the numeral 20 and the second hook by 21. The stem 22 has a loop 23 with side members 24 and 25. These connect together at the points 26 and 27, the ring 18 being fitted on either one or the other side elements 24 and 25. In this construction it will be seen by an inspection of Fig. 4 that the loop is substantially in the plane of the hooks. This arrangement does not give as much clearance between the prong and one of the sides of the loop designated by the measurement 28 as is given between the prong and the portion of the loop in the construction of Fig. 1, designated by the numeral 29. When one is fishing for large fish, the construction of Figs. 1 and 2 is usually preferred, and for small fish the construction of Figs. 3 and 4 may be preferable.

In the arrangement of Fig. 5, the first hook 30 and the second hook 31 are connected by a straight stem 32. The loop 33 is formed by an offset parallel strip 34 connecting with the straight stem at the point 35. In this case the ring is illustrated as being on the straight portion of the stem. This is not necessary. In this case, also, the hooks are shown as offset to one side.

In the construction of Fig. 7 I illustrate an arrangement with what may be termed a first hook 36, a second hook 37, connected by a single straight stem 38, which stem has abutment shoulders 39 thereon, with the ring 18 mounted on the straight stem and slipping between the limit shoulders 39. With this construction, therefore, a hook may rotate more freely on the ring than in the constructions having the loop, as when the side of the loop which does not have the ring sliding thereon engages the ring or the line this tends to prevent further rotation of the hook.

It will be seen by my construction that the ring is free to slide on the stem portion of the hook between the ends of the loop, or the stops, and in one position the effective attachment of the line is adjacent one end of the hook, and in another position adjacent the opposite end. If desired, either or both ends of the hook may be baited, and, obviously, when a fish becomes engaged by one hook, in its fight to loosen itself it is very apt to become caught by the other hook, thus increasing the chance of being properly hooked, therefore, of landing the fish.

Another advantage, using bait on opposite ends of the hook, is that a fish may strike at one of the baits and take this without being caught and then turn and strike at the other with the probabilities of being caught by either one or the other of the hooks.

In Fig. 6 I illustrate a construction using the arrangement somewhat like that of Fig. 5. In this case there is a straight stem 40 with the two hooks 41 and 42 secured thereto. A parallel strip of strong, stiff wire, such as piano wire, 43 is parallel to the stem 40 and has ends 44 twisted around the stem. These ends may be secured by solder or welding, if desired. The ring 18 slides on the thin wire which with the central portion of the stem forms a loop.

Various changes may be made in the details of construction without departing from the spirit or scope of the invention as defined by the appended claims.

I claim:

1. A double ended fish hook having a slip device mounted thereon to slip from adjacent one end of the hook to adjacent the opposite end of the hook, said slip device being for attachment of a line.

2. A double ended fish hook having a pair of limit stops thereon adjacent each hook, and a slip device operating between said stop means, the slip device being for attachment of a line.

3. A double ended fish hook having hooks bent in opposite directions and with a pair of stop means, one adjacent one hook and the other adjacent the other hook, and a line attaching device slidably mounted between the stop means.

4. A fish hook having at least two hooks and a connecting stem, the hooks being at opposite ends of the stem, and a slip means mounted on the stem slidable from adjacent one hook to a position adjacent the other hook, said slip means being for attachment of a line.

5. A fish hook having at least two hooks with a connecting stem, the hooks being at opposite ends of the stem, a line attached to the stem portion and having a slip connection thereon, with means to limit the slippage toward either hook.

6. A fish hook having a central stem with hooks at opposite ends thereof, a pair of stop means mounted on the stem, one adjacent one hook and the other adjacent the other, and an attaching device for securing a line to the stem, said device being slidable on the stem between the two stop means.

7. A fish hook having a central stem with at least two hooks, one at each end of the stem, the hooks being turned in substantially opposite directions, a slidable device on the stem for connecting a line thereto, and a pair of stop means on the stem, one adjacent one hook and the other adjacent the other hook to limit the movement of said slidable device.

8. A fish hook having a central stem, a hook extending from one end of the stem, and a second hook from the opposite end of the stem, such hooks being in substantially the same plane but extending in opposite directions from the stem, a ring slidably mounted on the stem and adapted for attachment of a line, and a pair of stop means on the stem, one adjacent one hook and the other adjacent the other hook to limit the movement of the ring.

9. A fish hook having a central stem with an elongated closed loop formed therein, a hook extending from one end of the loop, and a second hook from the opposite end of the loop, and means for attaching a line to the loop portion of the stem with the slip connection to slip from one end of the loop to the opposite end to positions adjacent either hook.

10. A fish hook having a central stem with an elongated closed loop, a first hook secured to one end of the loop, a second hook to the opposite end, said hooks being on opposite sides of the stem, and means mounted on the stem and operating in the loop to slide between opposite ends thereof for attachment of a line.

11. A fish hook having two hooks bent in reverse directions with a central stem connecting said hooks, the stem having an elongated loop with two sides and closed ends, a ring slidably mounted on one of the sides and operating between the two ends to allow slippage of the stem through the ring, said ring being adapted for attachment to a line.

12. A fish hook having a central stem with two sides connecting together at their ends forming a loop and with a hook extending from one end and another hook from the other end, a ring slidably mounted on one of the sides and allowing shifting of the hook between the two ends of the loop.

13. A fish hook having a central stem with a loop having opposite sides and two ends, the sides of the loop being substantially in the same plane, a hook extending from one end of the stem and another hook from the opposite end, the hooks being on opposite sides of said plane, a ring mounted on one of the sides of the stem operating in the loop and allowing slippage of the hook through the ring between the two ends of the loop.

14. A fish hook having a central stem with two sides joined together forming an elongated closed loop, a hook extending from one end of the stem and a second hook from the opposite end, the hooks and the two sides of the stem being substantially in the same plane, a ring mounted on one of the sides of the stem in the loop and allowing slippage of the hook between the ends of the loop.

15. A fish hook having a central substantially straight stem with limit shoulders at opposite ends thereof and hooks extending from the shoulders, the hooks thereby being at opposite ends of the stem, and a ring slidably mounted on the stem between said shoulders.

In testimony whereof I have signed my name to this specification.

WM. THOS. TOOLAN.